US005672818A

United States Patent [19]

Schaefer et al.

[11] Patent Number: 5,672,818

[45] Date of Patent: Sep. 30, 1997

[54] THROTTLE VALVE ADJUSTING UNIT

[75] Inventors: Wolfgang Schaefer, Grossbottwar; Klaus Kaiser, Markgroeningen; Martin Benda, Heilbronn; Eckard Reiling, Eisingen, all of Germany

[73] Assignee: Robert Bosch GmbH, Stuttgart, Germany

[21] Appl. No.: 678,802

[22] Filed: Jul. 12, 1996

[30] Foreign Application Priority Data

Jul. 13, 1995 [DE] Germany .......................... 95 25 510.0

[51] Int. Cl.$^6$ .................................................... G01M 15/00

[52] U.S. Cl. ........................... 73/118.2; 73/116; 73/118.1

[58] Field of Search .................................... 73/116, 117.2, 73/117.3, 118.1, 118.2, 202.5, 204.11, 204.14, 204.17, 204.22; 123/350, 370; 324/158.1; 340/439

[56] References Cited

U.S. PATENT DOCUMENTS

| | | | |
|---|---|---|---|
| 4,392,375 | 7/1983 | Eguchi et al. | 73/118.1 |
| 4,417,468 | 11/1983 | Yasuda et al. | 73/118.1 |
| 4,688,420 | 8/1987 | Minigawa | 73/118.1 |
| 4,703,649 | 11/1987 | Eitoku et al. | 73/118.1 |
| 4,715,220 | 12/1987 | Eitoku et al. | 73/118.1 |
| 4,866,981 | 9/1989 | Matsumoto et al. | 73/118.1 |
| 4,884,052 | 11/1989 | Eitoku et al. | 338/202 |
| 4,961,342 | 10/1990 | Matsumoto et al. | 73/118.1 |
| 5,070,728 | 12/1991 | Kubota et al. | 73/118.1 |
| 5,271,269 | 12/1993 | Rilling et al. | 73/118.1 |
| 5,460,035 | 10/1995 | Pfaffenberger | 73/118.1 |
| 5,520,044 | 5/1996 | Pfaffenberger | 73/118.1 |

FOREIGN PATENT DOCUMENTS

| | | |
|---|---|---|
| 0596392A1 | 5/1994 | European Pat. Off. . |
| 7108846 | 8/1973 | Germany . |
| 3740216 | 6/1989 | Germany . |
| 4206381 | 9/1993 | Germany . |
| 4209586A1 | 9/1993 | Germany . |
| 4206381A1 | 9/1993 | Germany . |
| 4241020 | 6/1994 | Germany . |

*Primary Examiner*—George M. Dombroske
*Attorney, Agent, or Firm*—Edwin E. Greigg; Ronald E. Greigg

[57] ABSTRACT

A throttle control valve in which potentiometer paths of a potentiometer are mounted on the lid and an electrical motor coupling is also provided, so that when the lid is attached to the throttle valve stub, the potentiometer and the control motor can be connected by simple joining in a single operation. The throttle control valve is intended for internal combustion engines for motor vehicles.

15 Claims, 3 Drawing Sheets

THROTTLE VALVE ADJUSTING UNIT

BACKGROUND OF THE INVENTION

The invention is based on a throttle valve adjusting unit as defined hereinafter.

From Offenlegungsschrift DE-A-42 41 020, a throttle valve adjusting unit with a control motor is known, in which the control motor is disposed axially to the throttle valve shaft, and the strands of the connection cable are soldered in a connection chamber remote from the throttle valve. The connection chamber is closed with a lid after the cable strands have been soldered on.

A disadvantage of this adjusting unit is that many soldering operations must be done at many soldering points. Each strand of the connection cable must be firmly soldered on the one hand to the control unit at a solder support point and on the other outside the adjusting unit, in a cable plug which while not shown in the aforementioned reference is hardly avoidable.

Another disadvantage is that for the potentiometer, a potentiometer carrier plate must be mounted between the housing and the lid.

Another disadvantage, since the potentiometer must be mounted first and only then can the cable strands be soldered in place, a smaller lid is additionally needed and must be mounted in order to protect the potentiometer.

Still another disadvantage is the difficulty of providing sealing between the connection cable and the housing and between the individual cable strands.

Another disadvantageous factor is that the cable is variously long, depending on the application, which greatly increases the number of variants that must be produced.

An especially major disadvantage for assembly is that the soldering work cannot be done until after the great majority of the throttle valve throttle valve has been put together.

The assembly process for the known throttle control valve is costly in terms of labor and is difficult to automate.

OBJECT AND SUMMARY OF THE INVENTION

The throttle control valve according to the invention offers the advantage over the prior art that with the lid that already includes a potentiometer path and at least one motor plug contact, a component is formed that can easily be produced by mass production and that can be mounted on the throttle valve stub in a simple way, normally in a single operation.

A particular advantage over other, known throttle valves is that in the course of mounting the lid, the wiper path of the potentiometer is attached and the electrical contacting of the control motor also takes place.

Advantageous further features of and improvements to the throttle valve of claim 1 are possible with the provisions recited herein.

With the sheet-metal stamped part, a connection pin of the coupling part can be made available in a simple, advantageous way, and a connection from the connection pin to the potentiometer path can be effected in a simple, advantageous way.

In an equally simple way and with a minimum number of individual parts, a direct connection from the connection pin of the coupling part to the motor plug contact can be made.

Mounting the carrier material on the inside of the lid makes possible a version that is simple and is easily manufactured, it includes few structural parts, and is compact. Another advantageous reduction in components is obtained if the at least one potentiometer path is mounted directly on the inside of the lid.

Mounting the wiper directly on a gear wheel that serves to transmit torque from the control motor to the throttle valve shaft advantageously reduces the number of required components considerably.

Providing the potentiometer guide between the throttle valve stub and the lid increases the accuracy of measurement of the potentiometer considerably and advantageously. Since the potentiometer guide, in a more-sophisticated version of the invention, does not extend over the entire lid, the lid can advantageously be made large enough that various things can be covered with the lid without thereby sacrificing measurement accuracy of the potentiometer.

The pluggable motor coupling that holds the motor plug contact and the motor counterpart plug contact together increases the long-term reliability and ease of assembly of the throttle valve throttle valve advantageously still more.

The invention will be better understood and further objects and advantages thereof will become more apparent from the ensuing detailed description of a preferred embodiment taken in conjunction with the drawings.

DESCRIPTION OF THE PREFERRED EMBODIMENT

The throttle control valve can be used in any internal combustion engine in which engine performance is to be influenced with the aid of a throttle valve adjustable by means of a control motor.

The exemplary embodiment shown can easily be modified such that besides being adjusted by the control motor, the throttle valve can for instance be adjusted mechanically by the gas pedal as well.

Figure 1:
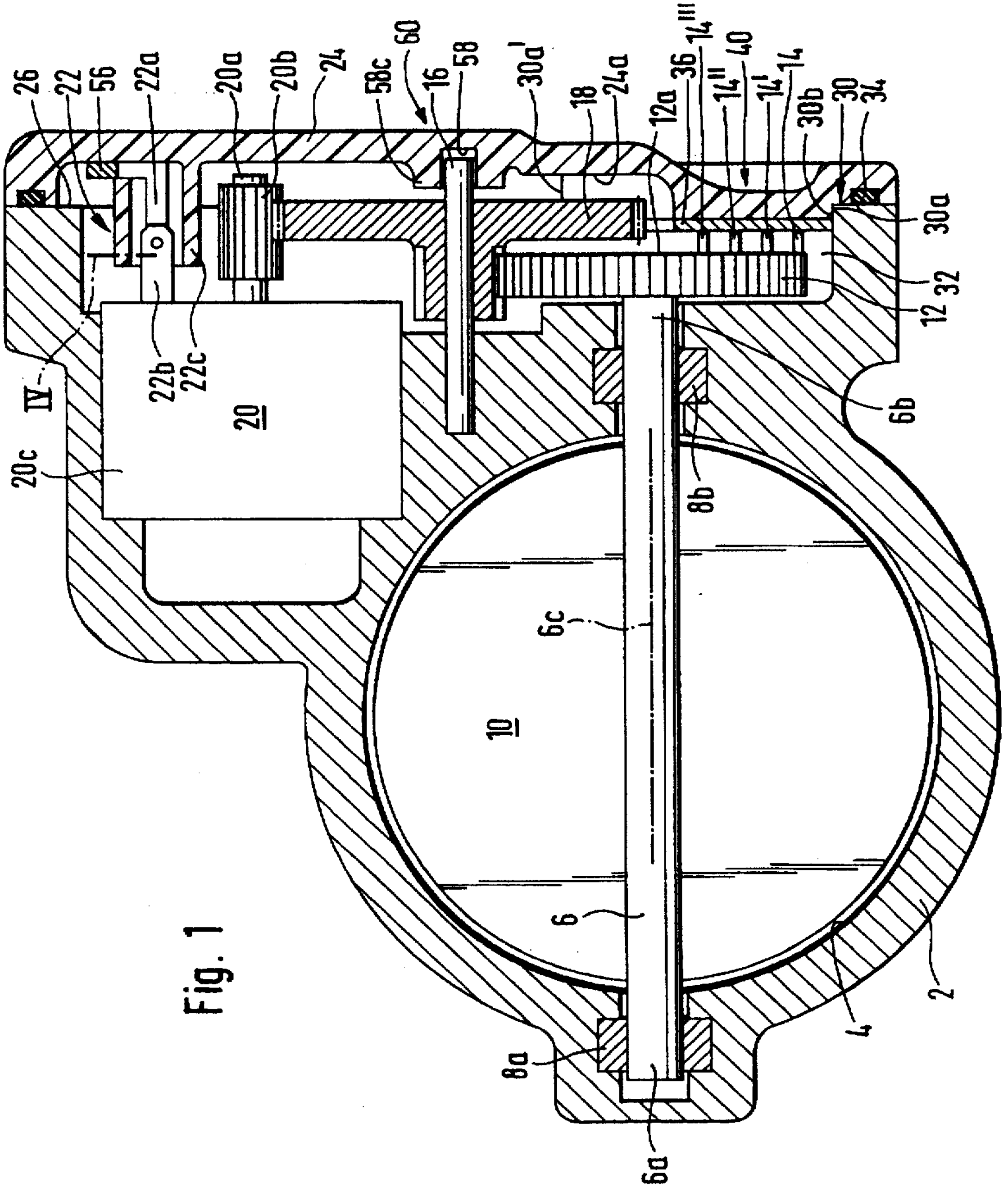
FIG. 1 is a cross section through the throttle valve.

FIG. 1 shows a throttle valve stub 2. A gas conduit 4 extends through the throttle valve stub 2. By way of example, the gas conduit 4 leads from an air filter, not shown, to a combustion chamber, not shown, or to a plurality of combustion chambers of an internal combustion engine, not shown. The suction shown in FIG. 1 extends crosswise through the gas conduit 4. Air or a fuel-air mixture can flow through the gas conduit 4.

A throttle valve shaft 6 extends crosswise through the gas conduit 4. The throttle valve shaft 6 has a left-hand end *6a* and a right-hand end *6b*. The throttle valve shaft 6 is pivotably supported in the throttle valve stub 2 with the aid of two bearings *8a* and *8b* on either side of the gas conduit 4. The imaginary center axis of the throttle valve shaft 6, about which the throttle valve shaft 6 rotates, will hereinafter be called the pivot axis *6c* and is represented by a dot-dashed line in FIG. 1.

A throttle valve 10 is secured by fastening screws, not shown, to the throttle valve shaft 6. The throttle valve shaft 6 can be pivoted by 90°, for instance, between two terminal positions. In one of the two terminal positions, the throttle valve 10 almost completely closes the gas conduit 4. In the other terminal position of the pivoting range of the throttle valve shaft 6, the gas conduit 4 is maximally opened.

Outside the gas conduit 4, a gear wheel 12 is joined to the throttle valve shaft 6 in a manner fixed against rotation at the end 6b of the throttle valve shaft 6. The gear wheel 12 has a face end 12a remote from the gas conduit 4. A wiper 14 is fixedly mounted to the face end 12a. Three further wipers 14', 14", 14'" are secured to the face end 12a beside the wiper 14, in the exemplary embodiment shown.

A shaft 16 is fixedly mounted to the throttle valve stub 2. A further gear wheel 18 is rotatably supported on the shaft 16.

In or on the throttle valve stub 2 there is a connection chamber 32 that receives an electric control motor 20. The control motor 20 has a housing 20c that is firmly anchored in the throttle valve stub 2. The control motor 20 has a drive shaft 20a, which protrudes parallel to the pivot axis 6c from the housing 20c on the face end and on which a drive wheel 20b, as a further gear wheel, is seated. The gear wheels 12, 18 and 20b are toothed wheels, for example, and are in mutual engagement for the sake of translating torque from the control motor 20 to the throttle valve 10.

Figure 4:
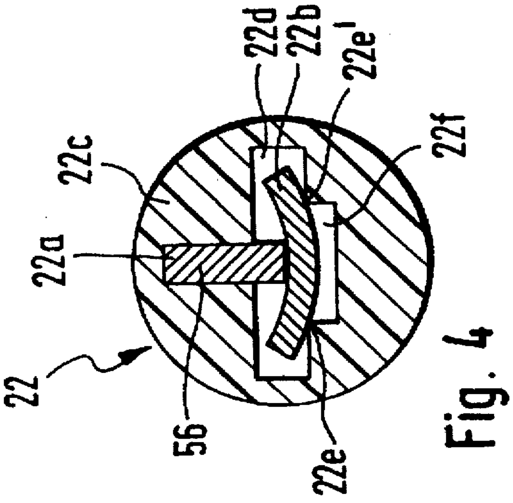
FIG. 4 shows a detail in cross section.

Parallel to the pivot axis of the drive shaft 20a and parallel to the pivot axis 6c of the throttle valve shaft 6, a motor counterpart plug contact 22b protrudes on the face end from the housing 20c of the control motor 20. Motor counterpart plug contact 22b is shown in FIGS. 1 and 4. The motor counterpart plug contact 22b is part of an electrical motor coupling 22, described in further detail hereinafter. The motor counterpart plug contact 22b on the control motor 20 serves to supply electrical power to the control motor 20 or to electrically trigger it.

A lid 24 is provided on one face end of the throttle valve stub 22. The lid 24 is secured to the throttle valve stub 2 with fasteners, not shown. The primary lengthwise direction of the lid 24 extends substantially crosswise to the pivot axis 6 of the throttle valve shaft 6 and crosswise to the pivot axis of both the drive shaft 20a and the gear wheel 18. The lid 24 rests on a bearing surface 26 on the throttle valve stub 2. The bearing surface 26 extends over the entire circumference of the lid 24. A lid guide 30a is also provided on the lid 24, and a stub guide 30b is provided on the throttle valve stub 2. The lid guide 30a and the stub guide 30b, in combination with one another, form a potentiometer guide 30, whose function will be described in further detail hereinafter.

The connection chamber 32 is formed between the throttle valve stub 2 and the lid 24. A seal 34 that seals the connection chamber 32 off from the outside is provided around the connection chamber 32, between the lid 24 and the throttle valve stub 2. Located in the connection chamber 32 are essentially the control motor 20, the drive wheel 20b, the two gear wheels 12 and 18, the wipers 14, 14', 14", 14'", and the electrical motor coupling 22. The connection chamber 32 may, depending on the version, be subdivided into a plurality of individual chambers.

The lid 24 has an inner side 24a toward the chamber 32. A carrier material 36 for a potentiometer 40 is applied to the inside 24a, facing the wipers 14, 14', 14'", 14'". For example, the carrier material 36 is glued to the inner side 24a.

Figure 2:
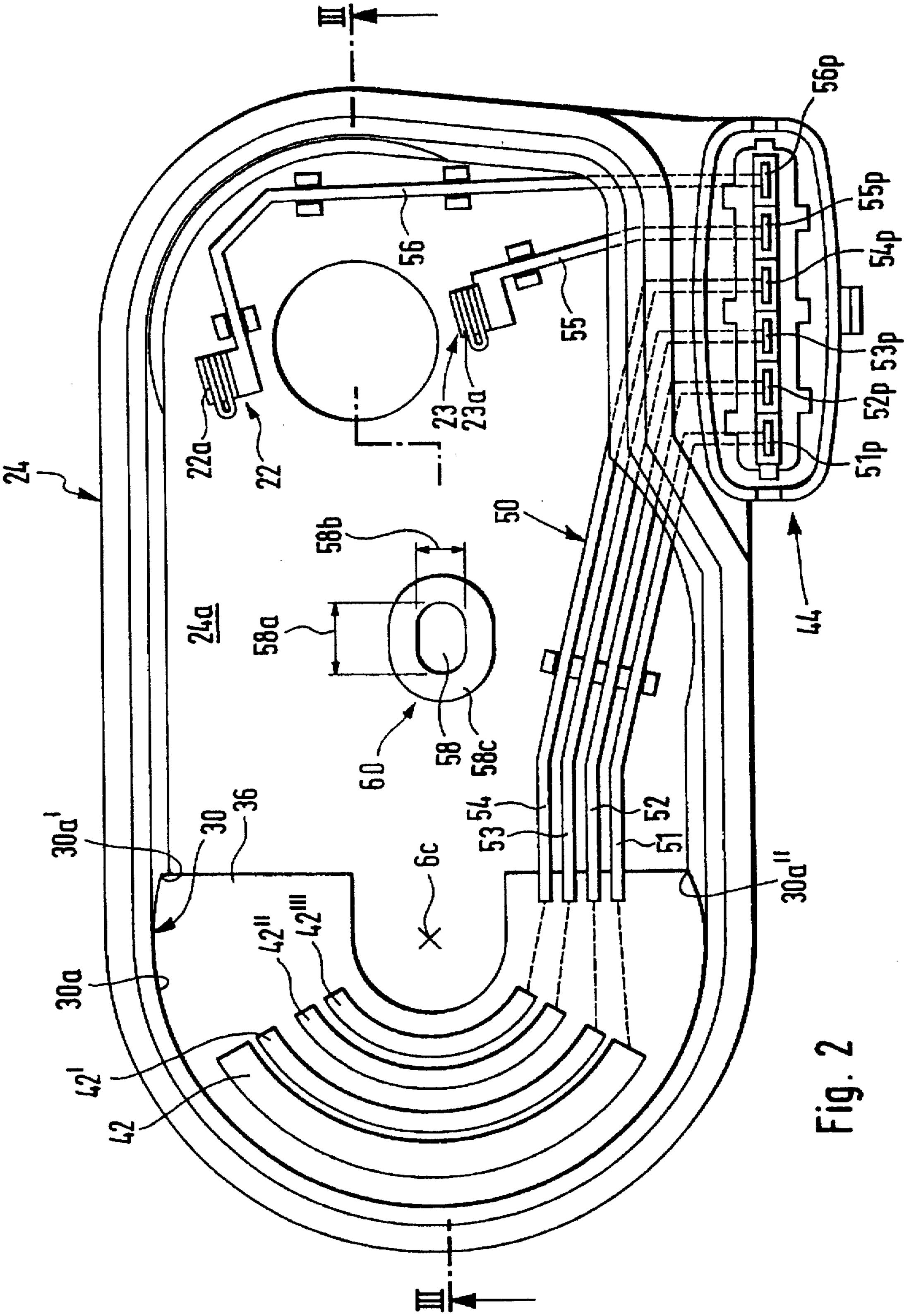
FIGS. 2 and 3 show various views of the lid.
Figure 3:
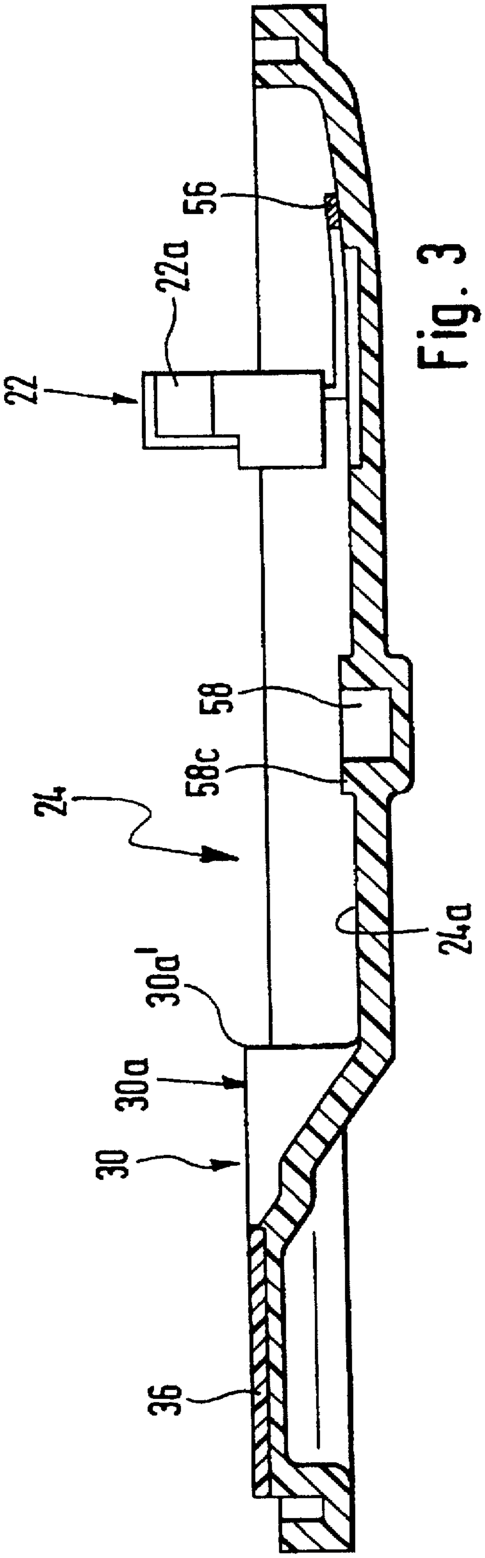

For the sake of better comprehension, in FIGS. 2 and 3, the lid 24 is shown again as a detail in various views and on a different scale. In FIGS. 2 and 3, the lid 24 is removed from the throttle valve stub 2. FIG. 2 shows the lid 24 looking in the direction of the connection chamber 32. In FIG. 3, a section in the direction marked III in FIG. 2 is shown. For the sake of simplicity, the proportions of the lid 24 shown in FIG. 1 are not entirely identical to the proportions shown in FIGS. 2 and 3.

In all the drawing figures, elements that are the same and function the same are provided with the same reference numerals.

A potentiometer path 42 (FIG. 2) is provided on the carrier material 36. The potentiometer path 42 is applied to the carrier material 36 in such a way that the finally mounted state, upon a pivoting motion of the throttle valve shaft 6, the wiper 14 sweeps along the potentiometer path 42. In the exemplary embodiment shown, three further potentiometer paths 42', 42", 42'" extend concentrically to the potentiometer path 42; the wipers 14', 14", 14'" sweep along these paths upon a pivoting motion of the throttle valve shaft 6. Together with the wipers 14, 14', 14", 14'", the potentiometer paths 42, 42', 42", 42'" form the potentiometer 40, with which the pivoted position of the throttle valve shaft 6 and thus the adjusted position of the throttle valve 10 can be ascertained very accurately.

An electrical coupling part 44 (FIG. 2) is formed onto the lid 24. The coupling part 44 is formed such that a further coupling part, not shown, can be electrically connected to the coupling part 44. The coupling part 44 together with the coupling part not shown forms an electric plug connection for connecting the throttle control valve to an electric control unit. The coupling part 44 is located above the sectional plane of FIGS. 1 and 2 and can therefore not be seen in FIGS. 1 and 2.

A sheet-metal stamped part 50 is cast onto the lid 24 or part-way into the lid 24. The sheet-metal stamped part 50 substantially comprises a first sheet-metal stamped part 51, a second sheet-metal stamped part 52, a third sheet-metal stamped part 53, a fourth sheet-metal stamped part 54, a fifth sheet-metal stamped part 55, and a sixth sheet-metal stamped part 56, and preferably also a first connection pin 51p and five further connection pins 52p, 53p, 54p, 55p, 56p.

Before the lid 24, which preferably of electrically nonconductive plastic, is given its shape, for instance by injection molding, the sheet-metal stamped part 50 is placed as a cohesive part into the injection mold. Webs between the sheet-metal stamped parts 51, 52, 53, 54, 55, 56 assure that the sheet-metal stamped part 50 can be manipulated as a cohesive component. This reduces the effort of manipulation considerably. Immediately before or during or after placement of the sheet-metal stamped part 50 in the injection mold, the webs that join the sheet-metal stamped parts 51, 52, 53, 54, 55, 56 are removed, so that each of the sheet-metal stamped parts 51–56 is firmly joined to the lid 24, insulated from one another at at least one or more points. The sheet-metal stamped part 51 is an elongated structure, similar to a sheet-metal strip, and comprises an electrically conductive material. One end of the sheet-metal stamped part 51 protrudes in the region of the coupling part 44 past the nonconductive material forming the lid 24 and there forms the connection pin 51p. The end of the sheet-metal stamped part 51 remote from the connection pin 51p is electrically connected to the potentiometer path 42. This connection is represented by a dashed line in FIG. 2. In the same way, the second sheet-metal stamped part 52 is connected to the potentiometer path 42'. The sheet-metal stamped part 53 and 54 are electrically connected to the potentiometer path 42" and 42'", respectively, in the same way.

The motor plug contact 22a of the motor coupling 22 is secured to the lid 24 on the inner side 24a toward the connection chamber 32. The sheet-metal stamped part 56 connects the motor plug contact 22a to the connection pin 56p (FIG. 2). As FIG. 1 shows, the sheet-metal stamped part 56, in the region where the motor counterpart plug contact 22b leading to the control motor 20 is located, is bent at an angle of 90° and extends in the direction of the motor counterpart plug contact 22b. There, the sheet-metal stamped part 56 ends in the form of the motor plug contact 22*a*. If the lid 24 is secured to the throttle valve stub 2, then the control motor 20 has electrical contact via the motor counterpart plug contact 22*b*, the motor plug contact 22*a* located on the end of the sheet-metal stamped part 56, and the sheet-metal stamped part 56 to the connection pin 56*p*.

In the exemplary embodiment selected, there is a second motor plug contact 23*a* as well, which is a component of a second electrical motor coupling 23 (FIG. 2). The second motor plug contact 23*a* is in electrical contact with a second motor counterpart plug contact. For the sake of simplicity, the second electrical motor counterpart plug contact is not shown in the drawing. The control motor 20 has electrical contact with the connection pin 55*b* via the second motor counterpart plug contact, not shown, the motor plug contact 23*a*, and the sheet-metal stamped part 55.

If the pivot axis 6*c* of the throttle valve shaft 6 is imagined as lengthened accordingly, then the pivot axis 6*c* in the mounted state passes through the lid 24 at a point marked by an X in FIG. 2, or more precisely by the center of the X. This point is assigned the reference numeral 6*c* in FIG. 2. The potentiometer guide 30 is formed by the cooperation of the lid guide 30*a* and the stub guide 30*b*. The stub guide 30*b* on the throttle valve stub 2 and the lid guide 30*a* on the lid 24 extend concentrically to the pivot axis 6*c*. The potentiometer guide 30 is provided only in the region of the potentiometer paths 42, 42', 42", 42'". In those portions of the lid 24 that are farther away from the potentiometer 40, the potentiometer guide 30 has been intentionally dispensed with. This has the advantage that the potentiometer guide 30 is excellently suited for exact positioning of the potentiometer 40 relative to the pivot axis 6*c*. It is in fact achieved that the regions of the lid 24 farther away from the potentiometer 40 cannot exert any radial forces on the lid 24, which could worsen the centering of the lid 24 in the region of the potentiometer 40. The lid 24 protrudes crosswise to the throttle valve shaft 6 or pivot axis 6*c* far beyond the region of the potentiometer guide 30. As a result, deformation that can never be avoided outside the potentiometer guide 30 provided in only a portion of the lid 24 cannot negatively affect the electrical position measuring signal to be ascertained by the potentiometer 40.

For the sake of a concrete realization of the potentiometer guide 30, in the exemplary embodiment shown in the drawing the lid guide 30*a* terminates at one end 30*a'* (FIG. 2). Beginning at the end 30*a'*, the lid guide 30*a* extends centrally to the pivot axis 60 along a circular arc, preferably approximately 210° about the pivot axis 60, and then ends again at an end 30*a"* (FIG. 2). The result attained thereby is that crosswise to the pivot axis C, the centering of the potentiometer paths 42, 42', 42", 42'" is excellent. To attain good centering, the lid guide 30*a* should extend over more than 180°, but on the other hand crosswise to the pivot axis 6*c* should not be too far away from the potentiometer paths 42, 42', 42", 42'". The stub guide 30*b* likewise extends in a circular arc concentrically to the lid guide 30*a*. In the exemplary embodiment, the lid guide 30*a* is a shoulder on the lid 24, and the stub guide 30*b* is a shoulder on the throttle valve stub 2. The shoulder on the lid 24 engages the shoulder on the throttle valve stub 2. The two shoulders form a good guidance fit. Although this is expedient in view of the good guidance quality, it should also be noted that the potentiometer guide 30 need not be continuously present; that is, the lid guide 30*a* and/or the stub guide 30*b* may be interrupted at various more or less large locations. In an extreme case, it suffices if the lid guide 30*a* and the stub guide 30*b* touch at least three radially operative guide points in the region of the potentiometer path 42, 42', 42", 42'".

An indentation 58 is provided on the inner side 24*a* of the lid 24. The shaft 16 protrudes on the face end past the gear wheel 18 on both ends. On one end, the shaft 16 is retained in the throttle valve stub 2, and on the other side of the gear wheel 18 the shaft 16 protrudes with slight radial play into the indentation 58. This creates an assembly aid 60 that facilitates the mounting of the lid 24 on the throttle valve stub 2. As the drawing shows, in the viewing direction chosen for FIG. 2 the indentation 58 is approximately the shape of an oval. One can also say that the indentation 58 has approximately the shape of a slit, with semicircular ends. The oval has one longer dimension 58*a* and one shorter dimension 58*b*. The longer dimension 58*a* extends approximately parallel to an imaginary line extending radially from the pivot axis 6*c*. The smaller dimension 58*b* extends crosswise to this imaginary radial line. The smaller dimension 58*b* is approximately as large as the diameter of the shaft 16 engaging the indentation 58 (FIG. 1).

The lid 24 is guided relative to the throttle valve stub 2 in the region of the potentiometer 40 with the aid of the potentiometer guide 30. Since the potentiometer guide 30 in the exemplary embodiment shown is embodied in the form of a circular arc and has a pivot axis 6*c* as its center point, the lid 24 would be pivotable about the pivot axis 6*c* if the shaft 16 were not to engage the indentation 58 provided on the lid 24. By means of the shaft 16 engaging the indentation 58, it is attained that during assembly the lid 24 will preserve the correct direction. The indentation 58 in cooperation with the shaft 16 thus acts as an assembly aid 60.

The shorter dimension 58*b* is approximately the same size as the diameter of the shaft 16 engaging the indentation 58, and the larger dimension 58*a* is only slightly larger. It is achieved as a result that even under extreme conditions during operation of the throttle valve throttle valve, the shaft 16 cannot be bent too sharply to the side. In other words, the lid 24 can still serve to reinforce the support of the gear wheel 18.

The larger dimension 58*a* is somewhat larger than the diameter of the shaft 16 engaging the indentation 58, so that even in the event of never entirely avoidable deformation of the throttle valve stub 2 or lid 24, the accuracy of guidance of the potentiometer 40 in the region of the potentiometer guide 30 is not impaired by the engagement of the shaft 16 with the indentation 58.

A bead 58*c* encompassing the indentation 58 is provided on the inner side 24*a* of the lid 24. This bead 58 serves as a runup surface and as an axial securing means for the gear wheel 18.

The lid 24 preferably comprises a nonconductive plastic. The plastic of the lid 24 is pulled forward in the direction of the control motor 20, in the region of the motor plug contact 22*a*, and there forms a contact support 22*c*. The contact support 22*c* fits at least partway around the motor plug contact 22*a*. When the lid 24 is mounted on the throttle valve stub 22, or in other words when the motor plug contact 22*a* is coupled to the motor counterpart plug contact 22*b*, the two contacts 22*a*, 22*b* enter into mutual electrically conductive contact and are pressed somewhat to the side in the process. Crosswise to the assembly direction, the contact support 22*c* supports the motor plug contact 22*a* and/or the motor counterpart plug contact 22*b*. The contact support 22*c* assures that the two plug contacts 22*a*, 22*b* cannot deflect too far to the side. The contact support 22*c* reinforces the pressing together of the two contacts 22*a*, 22*b* and thus assures that a durable, secure electrical connection between the two plug contacts 22*a*, 22*b* and thus provides that a durable, secure electrical connection between the two plug contacts 22*a*, 22*b* is assured.

As already noted, the carrier material 36 on which the potentiometer paths 42, 42', 42", 42'" are applied is glued to the inner side 24*a* toward the wipers 14, 14', 14", 14'" (FIG. 3). However, it is also possible to apply the potentiometer paths 42, 42', 42", 42'" directly onto the plastic of the lid 24 and to dispense with the carrier material 36 entirely. This has the advantage that fewer parts are needed, and high accuracy is attained. To enable applying the potentiometer paths 42, 42', 42", 42'" easily at the intended point on the lid 24, the lid 24 is embodied, in the region of the point intended for the application of the potentiometer paths 42, 42', 42", 42'", in such a way that this point protrudes somewhat beyond the surrounding regions, which makes the application of the potentiometer paths 42, 42', 42", 42'", for instance by screenprinting, substantially easier.

Applying the wipers 14, 14', 14", 14'" to one of the existing gear wheels 12 or 18 has the advantage that no additional part is needed to carry the wipers 14, 14', 14", 14'". As the exemplary embodiment shown illustrates, the wipers 14, 14', 14", 14'" are preferably mounted on the gear wheel 12 that is secured directly on the throttle valve shaft 6 in a manner secured against relative rotation, which has the additional advantage of a direct mounting that any possible transmission play between cooperating parts, for instance in the exemplary embodiment between the gear wheels 12 and 18, has no influence on the accuracy of the measurement of the position of the throttle valve 10.

Since the sheet-metal stamped parts 51, 52, 53, 54, 55, 56 are produced as a sheet-metal stamped part 50, whose shaping can be virtually arbitrary, it is possible to provide the coupling part 44 at virtually any arbitrary point on the lid 24. Nevertheless, only a minimum number of components is needed. The sheet-metal stamped parts 51, 52, 53, 54 for connecting the potentiometer 40 to the coupling part 44 and the sheet-metal stamped parts 55, 56 for connecting the control motor 20 to the coupling part 44 can be made from the preferably single sheet-metal stamped part 50. In the event that in special applications some other material is to be used for the sheet-metal stamped parts 51, 52, 53, 54 than for the sheet-metal stamped parts 55, 56, then two or more different sheet-metal stamped parts can also be used without significant additional effort.

As can easily be seen from the drawing, the motor coupling 22 is embodied such that dimensional tolerances can be compensated for to a high degree in all directions. In particular, secure contacting between the two plug contacts 22*a*, 22*b* is assured even if the motor plug contact 22*a* axially overlaps the motor counterpart plug contact 22*b* more or less. The same is correspondingly true for the motor coupling 23.

Since the sheet-metal stamped parts 51, 52, 53, 54, 55, 56, where they lead outward from the connection chamber 32 to the connection pins 51*p*, 52*p*, 53*p*, 54*p*, 55*p*, 56*p*, are cast into the plastic that forms the lid 24, secure tightness is assured.

The coupling part 44 can be designed to customer specifications, so that a counterpart, from which a cable leads for instance to a control unit, can be mounted on the coupling part 44.

The sheet-metal stamped parts 51, 52, 53, 54 are joined to the potentiometer paths 42, 42', 42", 42'" by bonding or via resilient contacts, for instance.

The bearing surface 26 between the throttle valve stub 2 and the lid 24, in the region of which the seal 34 is located, extends relatively far past the potentiometer guide 30. The bearing surface 26 extends along the circumference of the lid 24. By the provision of the potentiometer guide 30 only in the region of the potentiometer 40, one can make the lid 24 substantially larger, so that the lid 24 extends far beyond the potentiometer 40 in the direction toward the pivot axis 6*c* and can also serve to cover the gear wheels 12, 18 and the control motor 20 and still further can also be used for mounting the motor plug contacts 22*a*, 23*a* for furnishing the electrical motor couplings 22, 23 for the sake of power supply and for controlling the control motor 20, as well as for mounting the coupling part 44 for coupling a cable plug, not shown for the sake of simplicity.

FIG. 4 shows the motor coupling 22 in the form of a detail. This is a section taken through the motor coupling 22 along a line IV shown in dot-dashed lines in FIG. 1. For the sake of clarity, parts that are not directly part of the motor coupling 22 are not shown in FIG. 4. FIG. 4 shows the detail on a different scale. The form of the motor coupling 22 shown in FIG. 4 differs somewhat from the variant shown in FIG. 2.

The motor plug contact 22*a* forming the end of the sheet-metal stamped part 56 is cast into the contact support 22*c* (FIG. 4). The contact support 22*c* is of plastic and is made, together with the other plastic region of the lid 24, in a common injection mold. A slit 22*d* is provided in the contact support 22*c*. The slit 22*d* is stepped in form, resulting in a recess 22*f* with two support shoulders 22*e* and 22*e'* on the ends of the recess 22*f*.

The cross section of the motor plug contact 22*a*, shown in FIG. 4 and forming a rectangle, protrudes by a narrow lengthwise side from the plastic of the contact support 22*c* into the slit 22*d*. Before mounting of the lid 24 on the throttle valve stub 2, the cross section of the motor counterpart plug contact 22*b* is a substantially flat, plane rectangle. During the mounting of the lid 24 on the throttle valve stub 2, the motor counterpart plug contact 22*b* located on the control motor 20 is thrust into the slit 22*d*. However, since the motor plug contact 22*a* also protrudes laterally into the slit 22*d*, the motor counterpart plug contact 22*b* is bent somewhat to the side, as shown in FIG. 4, on being thrust into the slit 22*d*. The motor counterpart plug contact 22*b* deflects in its middle region into the recess 22*f*, and in the process it is supported on the supports 22*e*, 22*e'*. This deformation of the motor counterpart plug contact 22*b* takes place essentially elastically, so that the elastic tension arising in the motor counterpart plug contact 22*b* assures that even over relatively long operation, the motor counterpart plug contact 22*b* is pressed reliably against the lengthwise side of the motor plug contact 22*a*. Reliable contacting and current conduction are thereby attained. Depending on the dimensions, the motor counterpart plug contact 22*b* can optionally deform plastically as well. With the motor coupling 22, the effect attained is that the motor plug contact 22*a* and the motor counterpart plug contact 22*b* are clamped together durably and securely. The motor coupling 22 also makes it easy to mount the lid 24 on the throttle valve stub 22 and to remove it again.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle control valve, having a throttle valve secured to a throttle valve shaft rotatably supported in a throttle valve stub; a control motor, supported on the throttle valve stub, said control motor includes a drive gear coupled to the throttle valve shaft, for adjusting the throttle valve shaft; a potentiometer (40), including at least one wiper and at least one potentiometer path, for detecting and adjusting a position of the throttle valve shaft; a connection chamber, an electrical connection to which the control motor (20) and the potentiometer (40) are connected in said connection chamber; a lid (24) that closes off the connection chamber, the at least one potentiometer path (42, 42', 42", 42'") is mounted on the lid (24), and a coupling part (44) belonging to the electrical connection is formed onto the lid (24); at least one motor plug contact (**22*a*, 23*a*) is also provided on the lid (24), said motor plug contact, when the lid (24) is mounted on the throttle valve stub (2), is in electrical contact with a motor counterpart plug contact (22*b*) connected to the control motor (20**).

2. The throttle control valve according to claim 1, in which two motor plug contacts (**22*a*, 23*a*) and two motor counterpart plug contacts (23*b***) are provided.

3. The throttle control valve according to claim 2, in which at least one sheet-metal stamped part (50) that includes at least one sheet-metal stamped part (51, 52, 53, 54) is provided, and the at least one sheet-metal stamped part (51, 52, 53, 54) ends at the motor plug contact (**22*a*, 23*a*) and forms at least one connection pin (51*p*, 52*p*, 53*p*, 54*p*) of the coupling part (44**).

4. The throttle valve throttle valve according to claim 2, in which at least one sheet-metal stamped part (50) that includes at least one sheet-metal stamped part (51, 52, 53, 54) is provided, and the at least one sheet-metal stamped part (51, 52, 53, 54) is connected to the at least one potentiometer path (42, 42', 42", 42'") and forms at least one connection pin (**51*p*, 52*p*, 53*p*, 54*p*) of the coupling part (44**).

5. The throttle valve throttle valve according to claim 1, in which at least one sheet-metal stamped part (50) that includes at least one sheet-metal stamped part (51, 52, 53, 54) is provided, and the at least one sheet-metal stamped part (51, 52, 53, 54) is connected to the at least one potentiometer path (42, 42', 42", 42'") and forms at least one connection pin (**51*p*, 52*p*, 53*p*, 54*p*) of the coupling part (44**).

6. The throttle control valve according to claim 5, in which at least one sheet-metal stamped part (50) that includes at least one sheet-metal stamped part (51, 52, 53, 54) is provided, and the at least one sheet-metal stamped part (51, 52, 53, 54) ends at the motor plug contact (**22*a*, 23*a*) and forms at least one connection pin (51*p*, 52*p*, 53*p*, 54*p*) of the coupling part (44**).

7. The throttle control valve according to claim 1, in which at least one sheet-metal stamped part (50) that includes at least one sheet-metal stamped part (51, 52, 53, 54) is provided, and the at least one sheet-metal stamped part (51, 52, 53, 54) ends at the motor plug contact (**22*a*, 23*a*) and forms at least one connection pin (51*p*, 52*p*, 53*p*, 54*p*) of the coupling part (44**).

8. The throttle control valve according to claim 1, in which the at least one potentiometer path (42, 42', 42", 42'") is mounted directly on an inner side (**24*a*) of the lid (24**).

9. The throttle control valve according to claim 1, in which the at least one potentiometer path (42, 42', 42", 42'") is mounted on a carrier material (36) which is secured to an inner side (**24*a*) of the lid (24**).

10. The throttle control valve according to claim 1, in which the at least one wiper (14, 14', 14", 14'") is mounted on a gear wheel (12, 18, **20*b*) that transmits torque between the control motor (20) and the throttle valve shaft (6**).

11. The throttle control valve according to claim 1, in which a seal (34) that seals the connection chamber (32) off from the outside is provided between the throttle valve stub (2) and the lid (24).

12. The throttle control valve according to claim 1, in which a potentiometer guide (30) for centering the potentiometer (40) is provided in a region of the potentiometer (40).

13. The throttle control valve according to claim 1, in which the lid (24), crosswise to the throttle valve shaft (6, **6*c*), protrudes far beyond the region of the potentiometer guide (30**).

14. The throttle control valve according to claim 1, in which an assembly aid (60) is provided that makes mounting of the lid (24) on the throttle valve stub (2) easier.

15. The throttle control valve according to claim 1, in which a motor coupling (22) is provided that can be plugged so as to clamp the motor plug contact (**22*a*) and the motor counterpart plug contact (22*b***) together.

* * * * *